May 3, 1949.     P. O. CHAUDRON     2,469,032

INDIVIDUAL TEA AND COFFEE SERVICE

Filed Aug. 21, 1946

Inventor.
Percy O. Chaudron
By his Atty.
John H. McKenna

Patented May 3, 1949

2,469,032

UNITED STATES PATENT OFFICE 2,469,032

INDIVIDUAL TEA AND COFFEE SERVICE

Percy O. Chaudron, Cedartown, Ga.

Application August 21, 1946, Serial No. 692,051

5 Claims. (Cl. 222—115)

This invention relates to an improved tea and coffee service. More particularly it provides an improved combination of pot, cup and saucer, creamer and sugar receptacle which may be associated together in a conveniently compact assembly in which the pot rests on the saucer, the creamer closes the top of the pot, the sugar receptacle closes the top of the creamer, and the cup, inverted, also closes the top of the pot and encloses the creamer and sugar receptacle. The invention will find a particular utility in hotels, hospitals, restaurants, dining cars and the like, where it is customary for a waiter, a nurse, or other attendant, to carry individual servings of coffee or tea to the patron or patient, and where it may be a definite advantage to have all of the essentials of a cup of coffee or tea conveniently and compactly associated together for delivery as a unit, with assurance that the assemblage can rest in a small space, protectively covered, until the patron or patient is ready for his beverage.

It is among the objects of the invention to provide an individual tea and coffe service, the elements of which may be compactly assembled for convenient and safe transport on a saucer to a desired destination where all of the essentials for a cup of coffee or tea will be at hand in the assembly.

Another object is to provide an individual tea and coffee service wherein a pot, creamer, sugar receptacle and cup are adapted for compact inter-fitting assembly as a unit on a saucer for convenient transport by a waiter or the like to a patron or patient.

A further object is to provide an individual tea and coffee service wherein separate beverage, cream and sugar containers may be assembled in inter-fitting covering relation to each other and in which said containers and a cup may be associated as a unit for convenient and safe transport on a saucer.

Yet another object is to provide an individual tea and coffee service including a pot, a creamer, a sugar bowl, a cup and a saucer, stacked on the saucer and with either the creamer or the sugar bowl adapted to serve as a cover for the pot.

It is, moreover, my purpose and object generally to improve the structure and combinability of elements of individual tea and coffee service sets.

Figure 1:
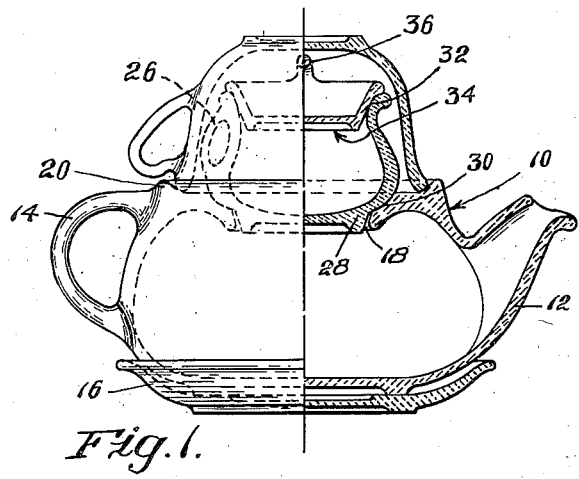
Fig. 1 is an elevation, partly in medial cross-section, of an individual tea and coffee service having the elements thereof formed and compactly assembled according to teachings of my invention.
Figure 5:
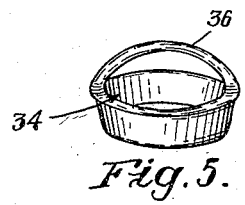
Fig. 5 is a perspective view of the sugar receptacle or bowl as embodied in Figs. 1 and 3.

Referring to the drawing, the pot indicated generally at 10 preferably will have capacity for holding an individual serving of coffee or tea, which may be either one cup or two cups depending upon the policy of the management of any particular establishment. The pot has a spout 12, a handle 14 and a base or bottom capable of resting on a saucer 16 which latter may be of a conventional shape.

The top wall of the pot has the filling opening 18 and has the larger diameter annular upstanding flange 20 for a purpose which will be obvious from an inspection of Fig. 1.

Figure 2:
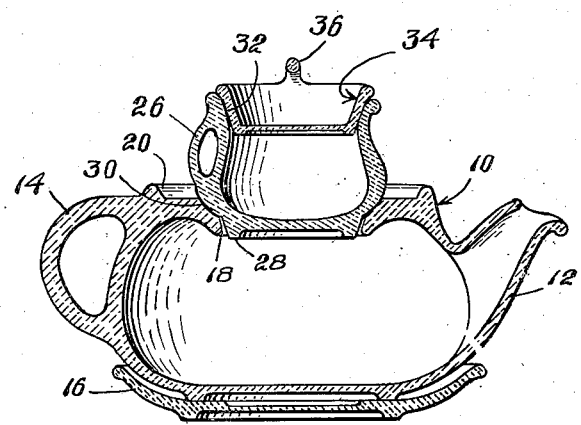
Fig. 2 is a medial vertical cross-sectional view of the assembly of Fig. 1 but with the inverted cup of Fig. 1 removed.
Figure 4:
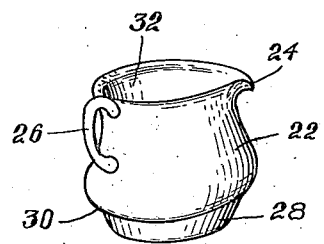
Fig. 4 is a perspective view of the creamer.
Figure 6:
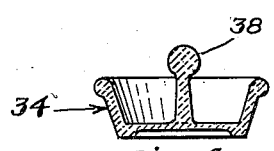
Fig. 6 is a medial cross-sectional view of a modified form of sugar receptacle.

A creamer is represented at 22, of size to hold a suitable individual serving of cream. As best seen in Fig. 4, the creamer has a usual pouring lip 24, handle 26, and its base part 28 has size and shape for nicely fitting within the top opening 18 of pot 10, as illustrated in Figs. 1 and 2. The body of the creamer, adjacent the base part 28, is annularly bulged to provide the exterior annular shoulder 30 for seating on the marginal region of the top wall of the pot around the fill opening 18. The top opening of the creamer is generally circular, with the walls inward from its top edge slightly tapering as at 32 for seating the similarly tapering exterior of the body walls of a sugar receptacle indicated generally at 34. The sugar receptacle is in the nature of an open top shallow dish which may have a rigid bail-type of handle 36, as represented in Figs. 1-3 and 5, or may have an upstanding knob-type handle 38, as shown in Fig. 6.

Figure 3:
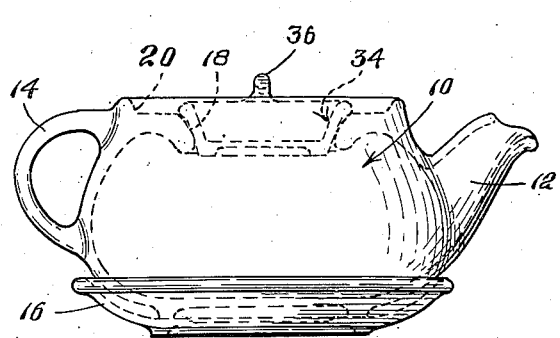
Fig. 3 is a side elevation of the assembly of Fig. 2 but with the creamer of Fig. 2 removed and the sugar receptacle of Fig. 2 directly covering the pot in Fig. 3.

As represented in Fig. 3, the body of sugar receptacle 34 has size and shape for seating in the fill opening 18 of pot 10 as well as in the top opening of the creamer as represented in Figs. 1 and 2.

A cup is indicated at 40 in Fig. 1, it being inverted and having its annular lip resting on the top wall of pot 10 within the annular flange 20.

The cup may be of a conventional shape with a handle 42 and an interior space for accommodating the creamer and sugar receptacle as illustrated in Fig. 1.

It will be obvious that, in the Fig. 1 assembly, both the creamer and the inverted cup constitute covers for the fill opening 18 of the pot, while the creamer is covered by the sugar receptacle within the inverted cup, which latter covers the sugar receptacle. The assembly conveniently may be carried on the saucer 16 to any desired destination where it may be set down as a unit on any available table or other support where it will occupy relatively little space until a patron or patient is ready for his beverage, at which time the pot may be replaced by the cup on the saucer, followed by pouring of the beverage from the pot into the cup. The creamer and sugar receptacle may remain on the pot, as in Fig. 2, while the beverage is being poured but, preferably, they will be lifted from the pot before pouring and the sugar receptacle may directly cover the pot, as suggested in Fig. 3.

Obviously, either or both sugar and cream may be put in the cup before or after pouring of the beverage.

The various elements of my improved individual service may be made of china, crockery, glass, metal or of any of various plastic or composition materials, and may be variously modified as to shapes and sizes without departing from the invention as defined in the accompanying claims.

I claim as my invention:

1. A beverage service, comprising a pot for holding a supply of the beverage and having a top wall with central fill-opening therein, said top wall being disposed appreciably below the plane of the top edges of the side walls of the pot whereby the top edge portions of the side walls extend as an annular flange above and around said top wall, an open top creamer having exterior maximum diameter substantially less than the interior diameter of said annular flange and having a base part seated on said top wall of the pot and closing said fill-opening, a sugar bowl seated within the walls at said open top of the creamer and substantially closing the open top of the creamer, and an inverted cup enclosing the creamer and sugar bowl and resting on said top wall of the pot within and restrained against lateral movement by the said annular flange at the top of the pot.

2. A tea and coffee service, comprising a pot having a top wall with fill-opening therein, a creamer having a maximum horizontal cross-sectional dimension substantially less than the horizontal cross-sectional dimension of the top of the pot, and having a base portion of size and shape to fit within said fill-opening of the pot and having an exterior annular shoulder for seating on said top wall of the pot, whereby the creamer constitutes a removable closure for the fill-opening of the pot, said creamer having an open top, a sugar bowl seated in the open top of the creamer and constituting a removable closure therefor, said top wall of the pot having an annular upstanding flange encircling the fill-opening of the pot, and an inverted cup enclosing said creamer and sugar bowl and having its annular lip resting on the top wall of the pot within said annular flange and restrained by the flange against lateral displacement.

3. A tea and coffee service, comprising a pot having a top wall with fill-opening therein, a creamer mounted on said top wall of the pot removably closing the fill-opening therein, there being inter-fitting portions on the pot and creamer restraining the creamer against lateral displacement, said creamer having a top opening therein, a sugar bowl mounted on said creamer in position substantially closing the top opening therein, there being inter-fitting portions on the creamer and sugar bowl restraining the sugar bowl against lateral displacement, and an inverted cup enclosing said creamer and sugar bowl and supported on said top wall of the pot, there being an annular flange on the pot within which the inverted cup fits and by which the cup is restrained against lateral displacement.

4. A tea and coffee service, comprising a pot having a top wall with fill-opening therein, an open top creamer having a base part for seating within said fill-opening as a removable closure therefor, a sugar bowl having a body portion of size and shape for seating within the open top of the creamer as a removable closure therefor and, selectively, for seating within said fill-opening of the pot as a removable closure therefor, an inverted cup adapted to rest on said top wall of the pot in covering relation to said fill-opening in said top wall, and adapted in said relation to enclose said creamer and sugar bowl when the creamer is seated in the fill-opening of the pot and the sugar bowl is seated in the top opening of the creamer, and means on the pot projecting above said top wall and adapted to engage the inverted cup exteriorly at a plurality of locations around the cup, thereby to restrain the cup against lateral movement relative to the pot.

5. A tea and coffee service, comprising a saucer, a pot resting on the saucer and having a top wall with fill-opening therein, an annular flange upstanding from the top wall and surrounding said fill-opening, an open top creamer having a base part closing said fill-opening and inter-fitting with portions of said top wall which restrain lateral displacement of the creamer, a sugar bowl substantially closing the top opening of the creamer and inter-fitting with wall portions of the creamer which restrain lateral displacement of the sugar bowl, and an inverted cup enclosing the creamer and sugar bowl and resting on said top wall of the pot within said annular flange and restrained by the flange against lateral displacement.

PERCY O. CHAUDRON.

REFERENCES CITED

The following references are of record in the file of this patent:

UNITED STATES PATENTS

| Number | Name | Date |
|---|---|---|
| D. 42,950 | Rice | Aug. 27, 1912 |
| 523,344 | Hancock | July 24, 1894 |
| 929,389 | Clement | July 27, 1909 |
| 943,512 | Blanke | Dec. 14, 1909 |
| 986,865 | Russell | Mar. 14, 1911 |
| 1,427,259 | Burton | Aug. 29, 1922 |
| 1,948,932 | McMickle | Feb. 27, 1934 |
| 2,041,563 | Meinecke | May 19, 1936 |

FOREIGN PATENTS

| Number | Country | Date |
|---|---|---|
| 11,178 | Great Britain | July 1, 1891 |